US012767400B2

(12) United States Patent
David et al.

(10) Patent No.: US 12,767,400 B2
(45) Date of Patent: Oct. 20, 2026

(54) OPENING SYSTEM FOR CONTAINERS THAT ARE UNDER PRESSURE

(71) Applicant: RAFAEL ADVANCED DEFENSE SYSTEMS LTD., Haifa (IL)

(72) Inventors: Asaf David, Alonei Abba (IL); Ran Chobotaru, Nahariya (IL); Michel Aflalo, Kiryat Bialik (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 62 days.

(21) Appl. No.: 18/863,318

(22) PCT Filed: May 7, 2023

(86) PCT No.: PCT/IL2023/050463
§ 371 (c)(1),
(2) Date: Nov. 5, 2024

(87) PCT Pub. No.: WO2023/218446
PCT Pub. Date: Nov. 16, 2023

(65) Prior Publication Data

US 2025/0296748 A1 Sep. 25, 2025

(30) Foreign Application Priority Data

May 9, 2022 (IL) .......................................... 292884

(51) Int. Cl.
*B65D 51/22* (2006.01)
*B65D 81/20* (2006.01)
*F16K 17/14* (2006.01)

(52) U.S. Cl.
CPC ....... *B65D 51/221* (2013.01); *B65D 81/2053* (2013.01); *F16K 17/14* (2013.01);
(Continued)

(58) Field of Classification Search
CPC .............. B65D 51/221; B65D 81/2053; B65D 2251/0021; B65D 2251/0093; F16K 17/14
See application file for complete search history.

(56) References Cited

U.S. PATENT DOCUMENTS 3,537,605 A 11/1970 Solowey
3,811,379 A * 5/1974 Sondheimer ............ F42B 22/12
367/133

(Continued)

FOREIGN PATENT DOCUMENTS

CN 101152901 A 4/2008
CN 102417018 A 4/2012
(Continued)

OTHER PUBLICATIONS

International Search Report for PCT/IL2023/050463, dated Aug. 3, 2023.

(Continued)

*Primary Examiner* — Eyamindae C Jallow
(74) *Attorney, Agent, or Firm* — The Roy Gross Law Firm, LLC; Roy D. Gross

(57) ABSTRACT

Disclosed is an opening system for a container that is closed with a lid, which is located under pressure. The system includes a) an arrangement suitable to allow the opening of said lid of said container; b) a flexible element suitable to be connected to said container, and suitable to be inflated; and c) a pressure-regulating subsystem suitable to produce an increase of pressure inside said container up to a value that causes the inflation of said flexible element and its tearing.

22 Claims, 8 Drawing Sheets

(52) U.S. Cl.
CPC ................ *B65D 2251/0021* (2013.01); *B65D 2251/0093* (2013.01)

(56) References Cited

U.S. PATENT DOCUMENTS

| | | | | |
|---|---|---|---|---|
| 4,523,538 | A | 6/1985 | Hollmann et al. | |
| 4,566,367 | A * | 1/1986 | Hickey | F42B 22/06 102/411 |
| 6,494,756 | B2 | 12/2002 | Michaud et al. | |
| 6,854,409 | B1 | 2/2005 | Galliano | |
| 2002/0112756 | A1 | 8/2002 | Farwell et al. | |
| 2007/0022936 | A1 * | 2/2007 | Potter | B63G 8/32 114/319 |
| 2012/0192979 | A1 * | 8/2012 | Barth | F15B 1/04 138/30 |
| 2018/0216912 | A1 | 8/2018 | Leroy et al. | |
| 2022/0009607 | A1 * | 1/2022 | Lämmle | F41F 3/10 |

FOREIGN PATENT DOCUMENTS

| | | | |
|---|---|---|---|
| CN | 103950514 | A | 7/2014 |
| CN | 108119006 | A | 6/2018 |
| CN | 111661269 | A | 9/2020 |
| CN | 111692913 | A | 9/2020 |
| DE | 2462267 | A1 | 3/1977 |
| DE | 102010048629 | B4 | 5/2012 |
| GB | 933957 | A | 8/1963 |
| JP | 2003222241 | A | 8/2003 |
| KR | 102016028746 | A | 3/2016 |
| KR | 1020190100688 | A | 8/2019 |

OTHER PUBLICATIONS

Written Opinion of the International Searching Authority for PCT/IL2023/050463, dated Aug. 3, 2023.
European Patent Office, Extended European Search Report for corresponding European Patent Application No. 23803159.5, dated Mar. 27, 2026, 2pp.

* cited by examiner

OPENING SYSTEM FOR CONTAINERS THAT ARE UNDER PRESSURE

CROSS-REFERENCE TO RELATED APPLICATION

This application is a National Phase of PCT/IL2023/050463, filed on May 7, 2023 which claims priority to and the benefit of Israeli Application No. 292884, filed on May 9, 2022, the disclosures of which are each incorporated herein by reference in their entirety.

FIELD OF THE INVENTION

The present invention relates to the field of opening mechanism for container lids. More particularly, the invention relates to a system that provides a reliable and rapid opening operation of container lids, even when said containers are under significant resistance forces.

BACKGROUND OF THE INVENTION

As is well known, bodies that are below liquid surface endure pressure as a function of the body depth—pressure rises as depth increases, and is proportional to the density of the liquid (ρ), gravity at the surface of overlaying material (g) and height of liquid column or depth within a substance (h) (according to the hydrostatic pressure equation: $P=P_0+\rho gh$). Therefore, it is clear that in the case of a container that is placed in liquid depth and has an opening lid (hereafter also referred to as "lid"), the power required for moving the components its opening mechanism has to overcome is the resisting pressure of the environment. Cleary, the deeper the container is placed, the more the components of the opening mechanism need to be resistive in order to support to the pressure of the environment.

Another challenge of the proposed scenario is providing proper sealing to the container, which can become complicated when using numerous mechanical sub-systems in the container, including a lid. Another aspect that should be resolved when opening containers under pressure is the fact that sudden changes in pressure can cause damages due to rapid movement of objects that are subjected to said change in pressure. In many cases such pressure change is performed gradually in order to prevent damages to certain components, which contradicts with the requirement for fast-opening operation.

Although this application refers mainly to containers that are under pressure due to their location below liquid surface, it should be obvious to any person skilled in the art that the present invention can be used in any other environment where a container needs to be opened under resistive forces. Of course, the fluid around the container is not restricted only to water or any other type of material. When a container is placed under water, or any other liquid, the opening mechanism need to overcome not only the pressure, but also the added mass of the liquid and the drag force that is applied on the lid of the container while opening said container. It should be noted that in the context of the present invention the surrounding fluid is not restricted only to liquid materials, and although there are references to "liquid" along the description, as any person skilled in the art can easily conclude, the term "liquid" can be replaced with other "fluids", such as gas.

The phrases "under pressure" or "high pressure" refer to a situation where the pressure of the environment is higher than the initial or current pressure inside the container.

Along this description the phrase "container" is used for the sake of brevity and simplicity, but it obviously does not mean to limit the invention to containers per se, or to any specific shapes of "containers", but only to describe any type of bodies that can comprise different components and can be opened. For example, a "container", according to the present invention, can refer to an underwater vessel, underwater tubing systems, aquaculture equipment, a storage vessel etc.

It is an object of the present invention to provide a system and method for the reliable and fast opening of containers that are under pressure.

It is another object of the present invention to provide a system and method that solve the problem of providing a fast opening of a container lid that is under pressure, while preventing significant pressure differences between the inner volume of said containers and the environment.

It is yet another object of the present invention to provide a system and method that can overcome the pressure, the added mass of liquid, and also the drag force of said liquid—all of which are a result of placing a container in liquid depth—thus providing a fast opening of container lids that are located in liquid depth.

Other objects and advantages of the invention will become apparent as the description proceeds.

SUMMARY OF THE INVENTION

The invention relates to an opening system for a container that is closed with a lid, which is located under pressure, comprising:

a) an arrangement suitable to allow the opening of said lid of said container;
b) a flexible element suitable to be connected to said container, and suitable to be inflated; and
c) a pressure-regulating subsystem suitable to produce an increase of pressure inside said container up to a value that causes the inflation of said flexible element and its tearing.

In one embodiment of the invention the lid is attached to the container with a hinge, causing it to open wide under the pressure of said inflated flexible element.

In another embodiment of the invention the flexible element is made of a hyperelastic material. The flexible element may further comprise weak points configured to be torn in a pre-defined pattern. In a further embodiment the flexible element is made of a rubber material.

In yet another embodiment of the invention the pressure-regulating subsystem comprises:

I. at least two pressure sensors;
II. tubing components;
III. a controller; and
IV. an inflation device suitable to raise pressure in a container;

wherein at least one pressure sensor is suitable to be located inside said container, and at least one sensor is suitable to be located outside said container, and wherein the controller is adapted to receive information from said pressure sensors and to control the operation of said device suitable to raise pressure in said container, and wherein said tubing components comprise a tube suitable to connect the outlet of said inflation device and the inner volume of said container.

The tubing components may further comprise a non-return valve that is located along the tube that connects the outlet of the device suitable to raise pressure in the container and the inner volume of said container. In another embodiment it may further comprise an additional valve, which is located between the non-return valve and the container.

As said, the controller is adapted to control the opening of the container's lid. In one embodiment it can be provided with a program for opening the container's lid that is based on the pressure measurements performed by the system. In another embodiment the controller is provided with a program for opening the container that is based on a predetermined timing. The controller may further comprise a timing component that is suitable to communicate with the controller. Additionally, the controller can in some embodiments be remotely controlled.

The container can be of any suitable kind and can be for instance chosen from an underwater vessel, an underwater tubing system, aquaculture equipment, and a storage vessel.

The flexible element according to the invention, in embodiments of the invention, is provided with weak points. In other embodiments of the invention, the system may comprise tearing elements, for instance, pyrotechnic means, suitable to induce tearing of the flexible element. In some embodiments the flexible element is external to the container. In embodiments of the invention the flexible element is provided with perforations suitable to allow pressure comparison between both sides of the flexible element.

According to embodiments of the invention the device suitable to raise pressure in a container is a pump. In other embodiments, the device suitable to raise pressure in a container is a compressed gas tank.

The invention also encompasses a method for opening a container that is closed with a lid, which is located under pressure, comprising:

a) providing mechanical means suitable to allow the opening of said lid of said container;
b) providing a flexible element suitable to be connected to said container, and suitable to be inflated;
c) providing a pressure-regulating subsystem suitable to produce an increase of pressure inside said container up to a value that causes the inflation of said flexible element and its tearing, said pressure-regulating subsystem further comprising at least two pressure sensors, tubing components, and a controller;
d) providing a device suitable to raise pressure in said container;
e) measuring the pressure inside and outside said container by said pressure sensors;
f) performing pressure values analysis by said controller;
g) activating the inflation process of said flexible element by a signal that is sent from said controller to said device—suitable to raise pressure in said container—of said pressure-regulating subsystem, according to activation terms of the system;

BRIEF DESCRIPTION OF THE DRAWINGS

In order to better understand the invention and to see how it may be carried out in practice, embodiments will now be described, as well as in the detailed description, by way of non-limiting examples only, with reference to the accompanying figures.

The attached figures are.

DETAILED DESCRIPTION OF EMBODIMENTS OF THE INVENTION

The present invention relates to a system and method that provide an opening operation of containers that are under pressure and have lid closure. The system and method, according to the present invention, also solve the problem of providing a fast opening of container lids that are under pressure, while preventing significant pressure differences between the inner volume of said containers and the environment. Those advantages over the prior art, in addition to other objects and advantages, will be presented along the description with references to the figures.

Figure 1:
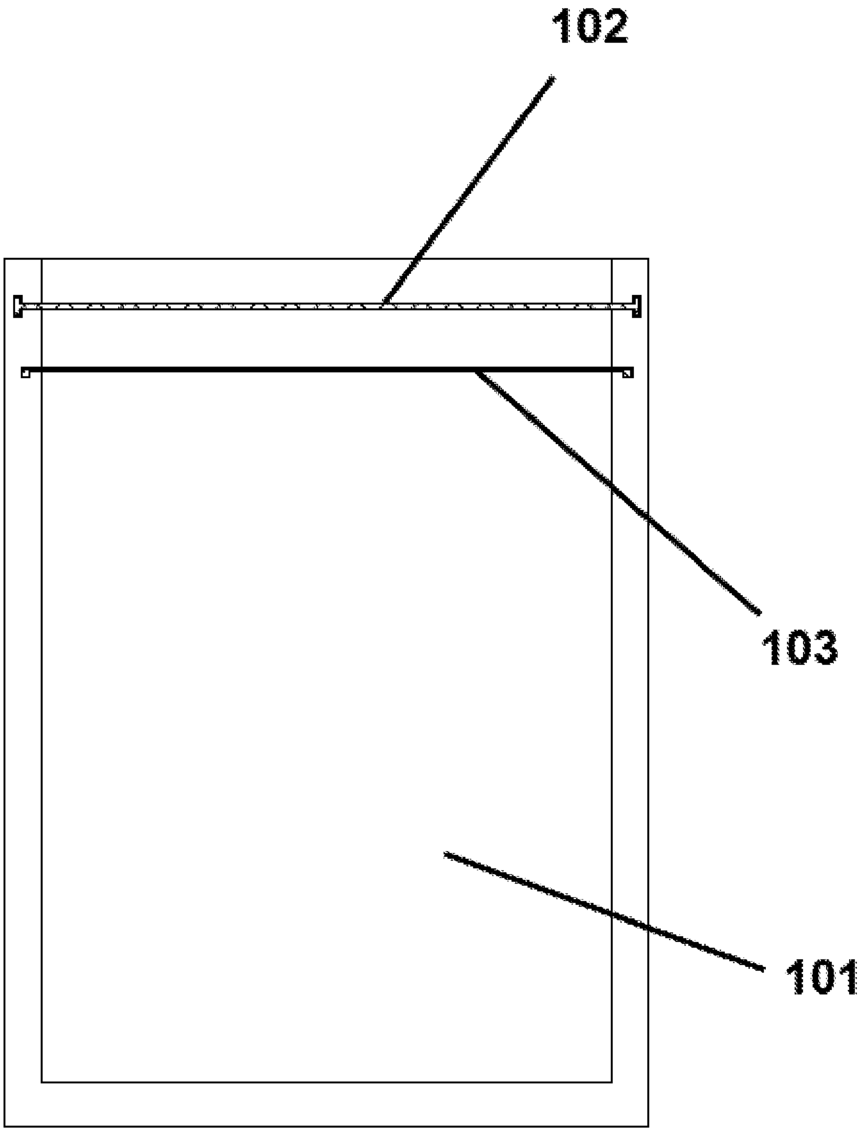
FIG. 1 is a front view of a container, according to one embodiment of the invention, shown in a closed position.

FIG. 1 is a front view of a container 101, according to one embodiment of the invention, which comprises lid 102 that is connected to the top portion of container 101 by a rotational hinge (not shown). When lid 102 fully occupies the opening of container 101, container 101 is closed and sealed. In order to improve the sealing between container 101 and lid 102, one or both of them can further comprise sealing element(s), such as rubber bands. Container 101 and lid 102 are adapted to endure high pressure either from the environment or from inside the container. The properties of container 101 and lid 102, such as size, thickness, type of material, density, weight, etc., are suitable to be adjusted according to their purpose and operational method (e.g., the pressure values around them or the depth they need to reach, which determines the pressure they will endure, and the content they need to accommodate).

As mentioned, according to this specific embodiment, the connection between container 101 and lid 102 is performed by a rotational hinge, but this does not mean to limit the invention to any specific kind of connection, and it can obviously be replaced by other mechanical connections that allow to open and close the lid of a container. According to another embodiment of the invention, the lid and the container are not permanently connected, and the lid can be secured to the container in order to close and seal it, and be detached when suitable force is applied. According to such an embodiment where the lid is detached from the top portion of the container, the container and the lid can also comprise a connection element that keeps the lid connected to another part of the container after detaching from its top portion, for example, by a chain. Such an embodiment is suitable for cases where one wishes to avoid causing damage to the hinge, thus not risking breaking the mechanism while opening the container's lid.

Although the invention presents an opening system for containers that are under pressure, it should be noted that the invention is not restricted only to an opening mechanism, but rather comprises a pressure-regulating subsystem (not shown in the figures), suitable to measure the pressure of the environment near the container and of its inner volume. For that purpose, the pressure-regulating subsystem comprises at least two pressure sensors, wherein at least one sensor is located inside the container, and at least one sensor is located outside the container. The pressure sensor(s) located outside the container can be attached to said container, or alternatively, otherwise positioned in close-proximity thereto. Based on this information, it is the purpose of the pressure-regulating subsystem to calculate the pressure difference, thereby to regulate the opening mechanism. The subsystem also comprises tubing components, a controller, and a device suitable to increase pressure inside the container.

According to one embodiment of the present invention, the device suitable to increase pressure inside the container is a water pump that uses water from the environment, or from a water vessel, and causes the flow of said water into the container. In order to increase the pressure to a sufficient value inside the container as a result of entering water, the container has to initially contain a compressible gas, such as air (or other gas that can be compressed), so that when the water enters the container, the air will reach a desired pressure value as a result of the compression, thus increasing the pressure inside the container. The motivation to increase pressure in the container will become apparent as the description proceeds. Although the description of this embodiment refers to a water pump, as obvious to any person skilled in the art, this type of pump can operate with many other liquids and is not limited to water, which is used only for the sake of illustration. It is also obvious to a person skilled in the art that the pressure-regulating subsystem or parts of its components described along the application can be replaced with any other system, components or mechanism suitable to increase the pressure inside the container to the required level.

Figure 7:
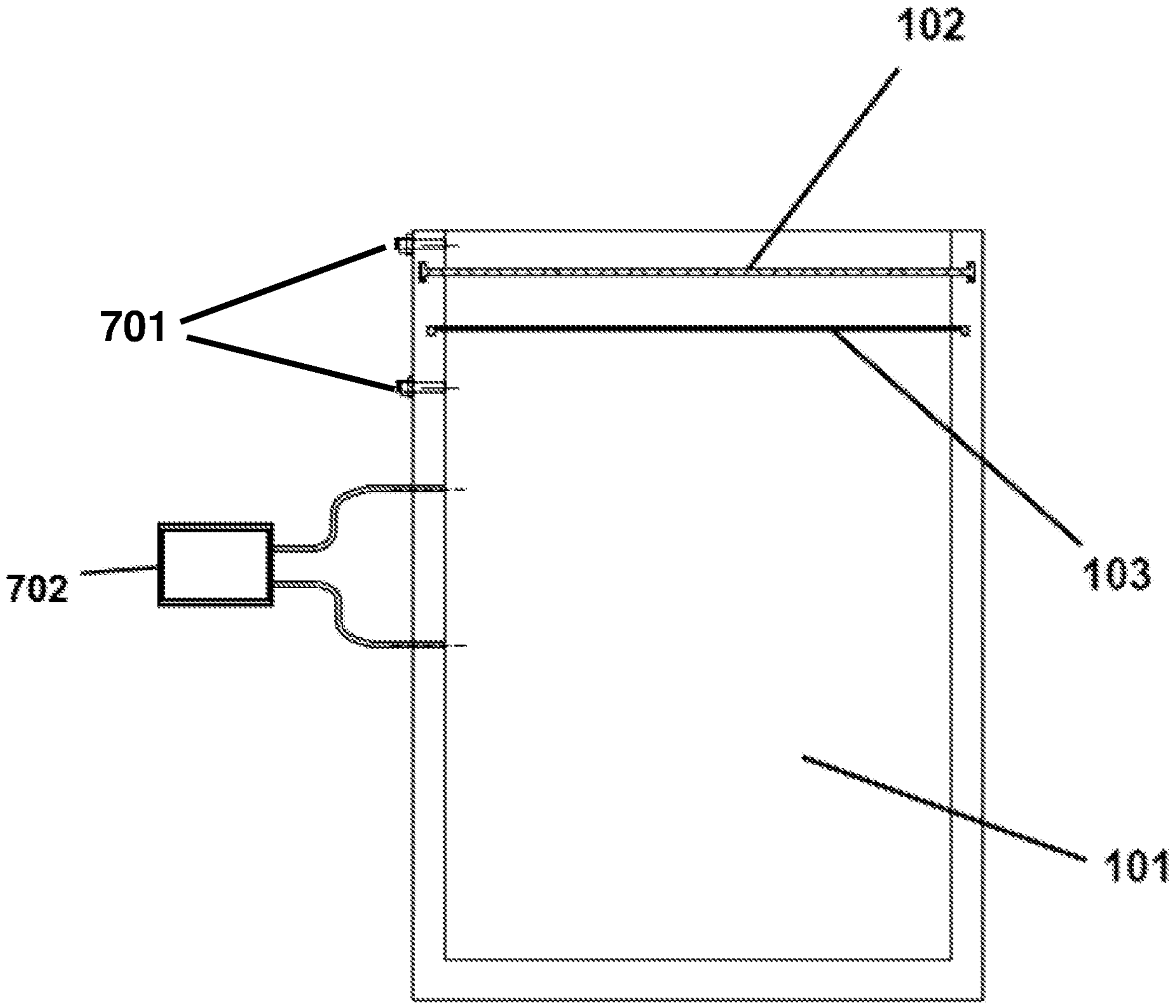
FIG. 7 is a front view of container 101 of FIG. 1, further comprising pressure sensors and a controller.

As previously mentioned, the subsystem that comprises a device suitable to raise pressure in the container in this embodiment, also comprises pressure sensors, tubing components, and a controller. According to this embodiment, wherein the device suitable to increase pressure in the container is a water pump, said pump is connected to the container by said tubing components. The tubing components comprise a tube that connects the outlet of the pump and the inner volume of the container, and can also comprise a non-return valve that is located between those two edges. According to another embodiment of the present invention, the tubing components further comprise an additional valve, such as a stop-valve, which is located between the non-return valve and the container. The additional valve can be useful for backup or maintenance purposes. FIG. 7 is a front view of container 101 of FIG. 1, further comprising pressure sensors 701 and controller 702.

The controller receives the reading of the pressure sensors, wherein at least one sensor is located inside the container, and at least one additional sensor is located outside and in close proximity to the container. In order to open the container, the internal pressure needs to be higher than the pressure of the environment, and more specifically, the generated force that pushes the lid from within the container (as a result of raising pressure) has to overcome the forces acting in the opposite direction as a result of the fluid pressure and the weight of the lid itself. According to another embodiment of the present invention, the container can further comprise a pushing element suitable to assist the opening of the lid, for example, by positioning a spring adjacent to the lid in a compressed state and utilizing its elastic potential energy when opening the lid.

The controller is also suitable to control the operation of the pump and its accompanying valve(s), so that it can be turned ON and OFF. The OFF command can be automatically sent to the pump upon detecting that the pressure value at the inner volume of the container is relatively higher than the pressure of the environment by a pre-defined factor (also referred to herein as "release threshold"). In order to even shorten the time required to open the container, the pressure inside the container can be pre-raised to a value that will not cause the opening of the container, but will be close enough to shorten the required time later, leaving just a small pressure increase needed for opening the container.

According to another embodiment of the present invention, the device suitable to raise pressure inside the container is a compressed gas tank. The gas can be air, for example, but both the gas in the tank and in the container are not limited to air, and can be replaced with any other gas suitable to be compressed up to a desired pressure value, and the use of "air" throughout this description is used only as an example and should not be interpreted as a single possible option of gas. The use of compressed air is similar to the use of water or other fluids, apart from the fact that it requires a compressed air tank instead of or in addition to a pump.

The exact timing of opening the container can be predetermined, can be triggered in real-time locally, or it can be remotely controlled. According to one embodiment of the present invention, the system comprises a timing component that communicates with the controller and thus controls the opening timing. The timing, according to this embodiment, can be determined by measured parameters of the system, such as the signals from the pressure sensors. According to another embodiment of the present invention, the system further comprises remote-communication elements suitable to receive commands from an operator and start the opening operation.

Figure 2:
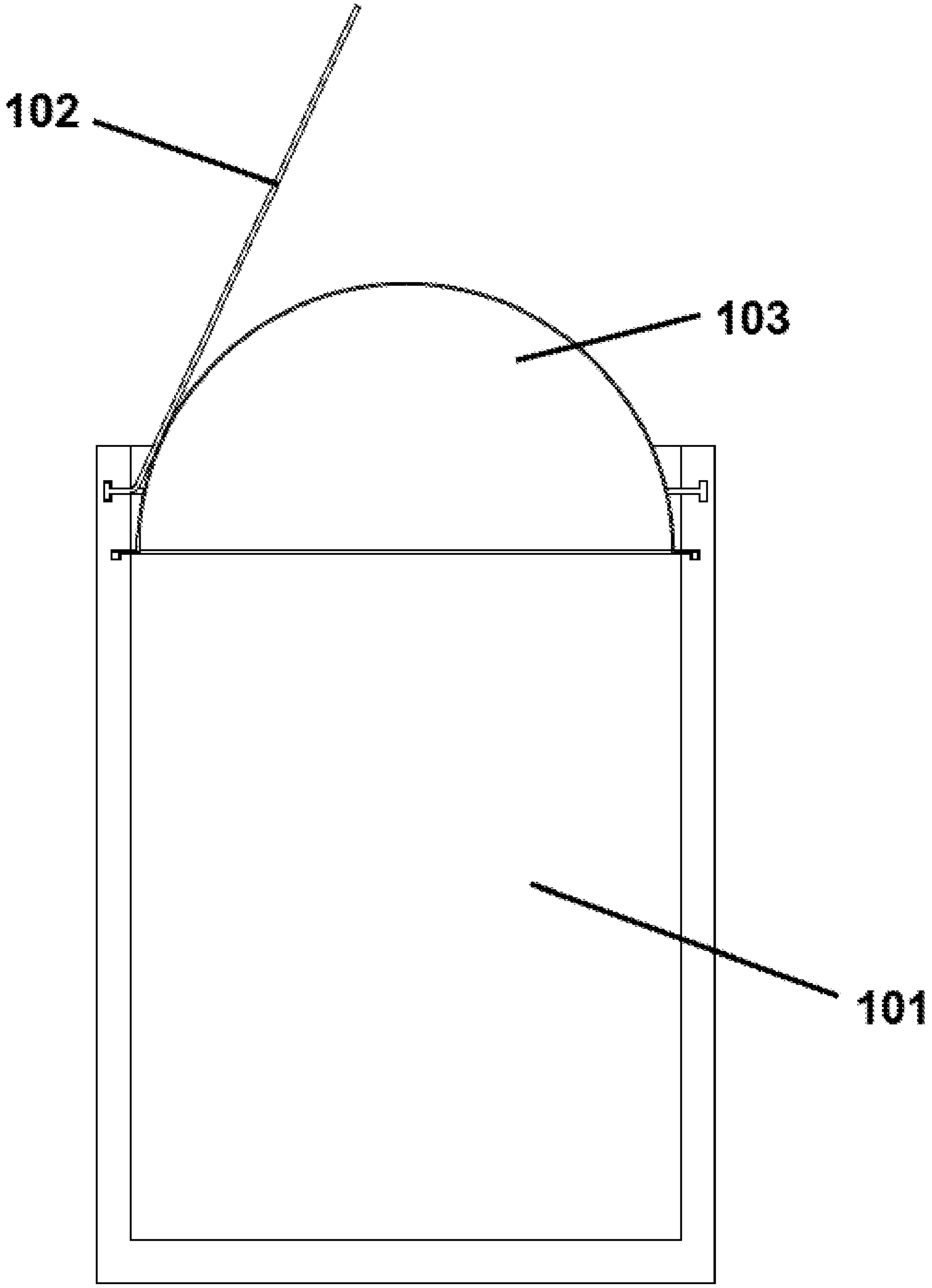
FIG. 2 is a front view of the container of FIG. 1, showing a flexible element pushing the lid of the container.
Figure 3:
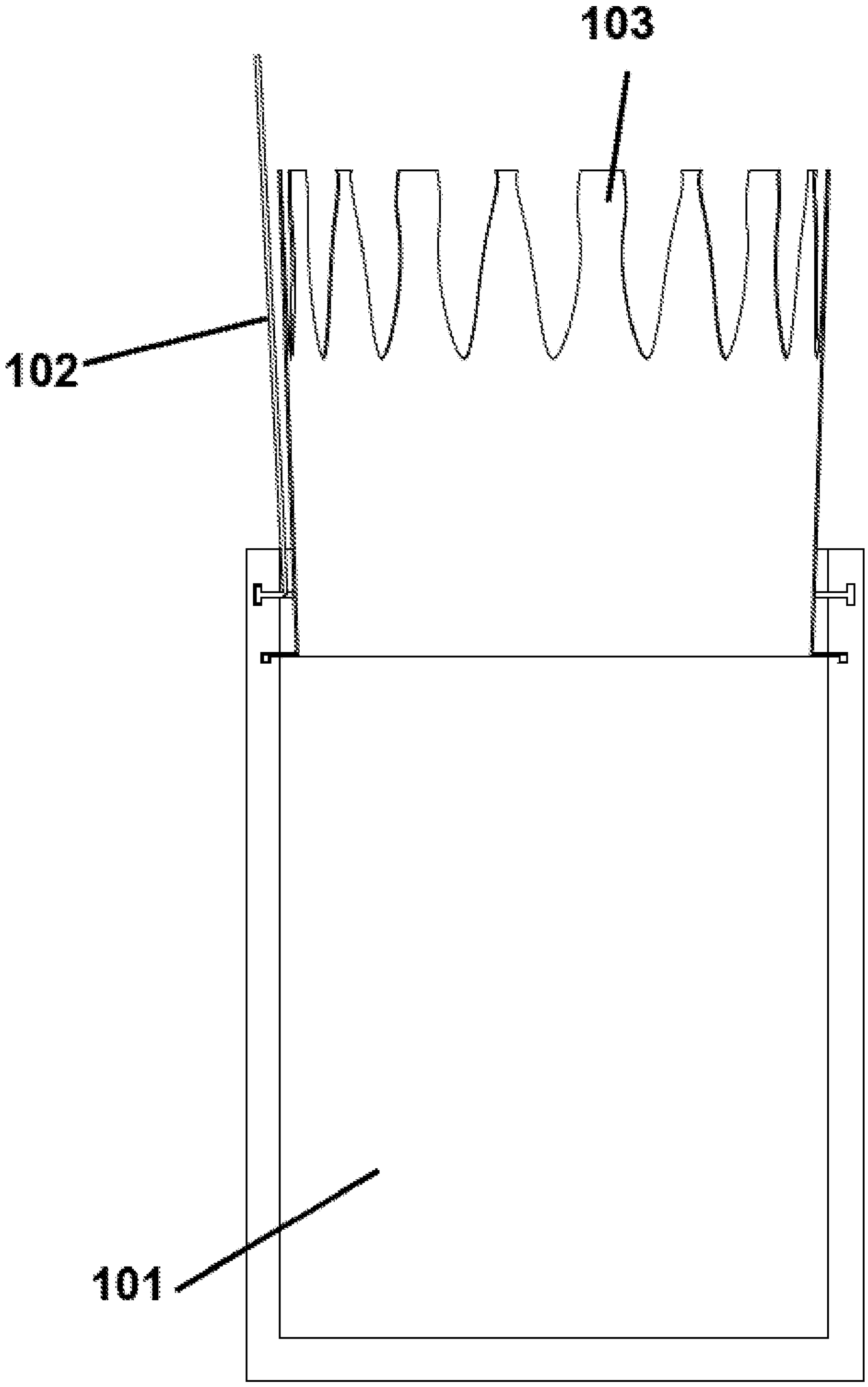
FIG. 3 is a front view of the container of FIG. 1, wherein the flexible element of FIG. 2 is torn after the lid of the container was pushed to a vertical position—causing the container to be in an opened position.

As said, the container comprises a volume of a compressed fluid, such as, for instance, air, in order to reach a desired pressure value by compressing said compressed fluid (which according to one embodiment, can be performed by a flow of water, air, or other fluid into the container), thus raising the pressure inside the container. Container 101 of FIG. 1 further comprises flexible element 103, suitable to be inflated when pressure is applied to its surface. FIG. 2 is a front view of the container of FIG. 1, showing flexible element 103 pushing lid 102 of container 101 as a result of pressure differences between the inner pressure within container 101 and the environment. As flexible element 103 inflates, it pushes lid 102, thus opening container 101. According to one embodiment of the invention, flexible element 103 is adapted to be torn when reaching a certain pressure difference value. After the tearing of element 103 the content (not shown in the figures) of container 101 can be released. According to this embodiment of the invention, the system further comprises initial-opening elements suitable to separate the connection between lid 102 and container 101, for example, pyrotechnic, pneumatic, hydraulic, or mechanical means. After the initial opening, flexible element 103 keeps pushing lid 102. According to yet another embodiment of the invention, flexible element 103 comprises structurally weak points, so that its tearing is controllable in order, for example, to allow components pre-installed within the container to exit said container with minimal contact with the flexible element. Such weak points can be, for example, thinner areas over the element, arranged in a desired pattern. Such a pattern can be, for example, a circle around the perimeter of the element, a cross-sign at the middle of the element, etc. Illustrative weak points, according to this embodiment, are shown in FIG. 8. FIG. 3 is a front view of container 101 of FIG. 1, wherein flexible element 103 of FIG. 2 is torn after lid 102 was pushed to a vertical position-causing container 101 to be in an opened position. The flexible element in the abovementioned embodiments is selected in some embodiments from a hyperelastic material, such as rubber, nylon etc.

The use of a flexible element provides an extremely fast opening of containers and release of objects from containers that are under pressure, as will be further explained in the description below with reference to an exemplary embodiment. Another great advantage of the system in relation to the prior art is the fact that the use of a flexible element prevents the loss of rising pressure inside the container, since it acts as a barrier and protects from air flow to cause bubbling, which in turn can affect the opening of the lid. By using a flexible element, the pressure inside the container can raise gradually without any losses.

Figure 4:
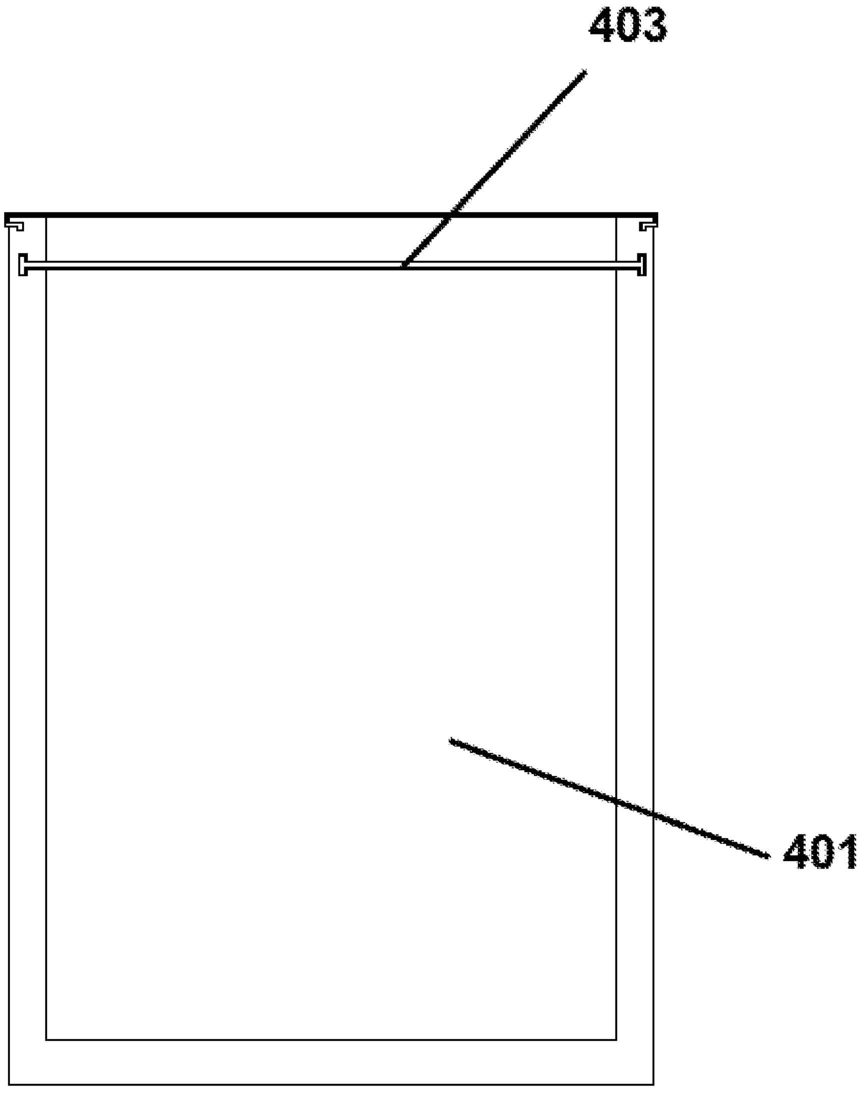
FIG. 4 is a front view of a container, according to another embodiment of the invention, shown in a closed position, wherein the container comprises an external flexible element.
Figure 5:
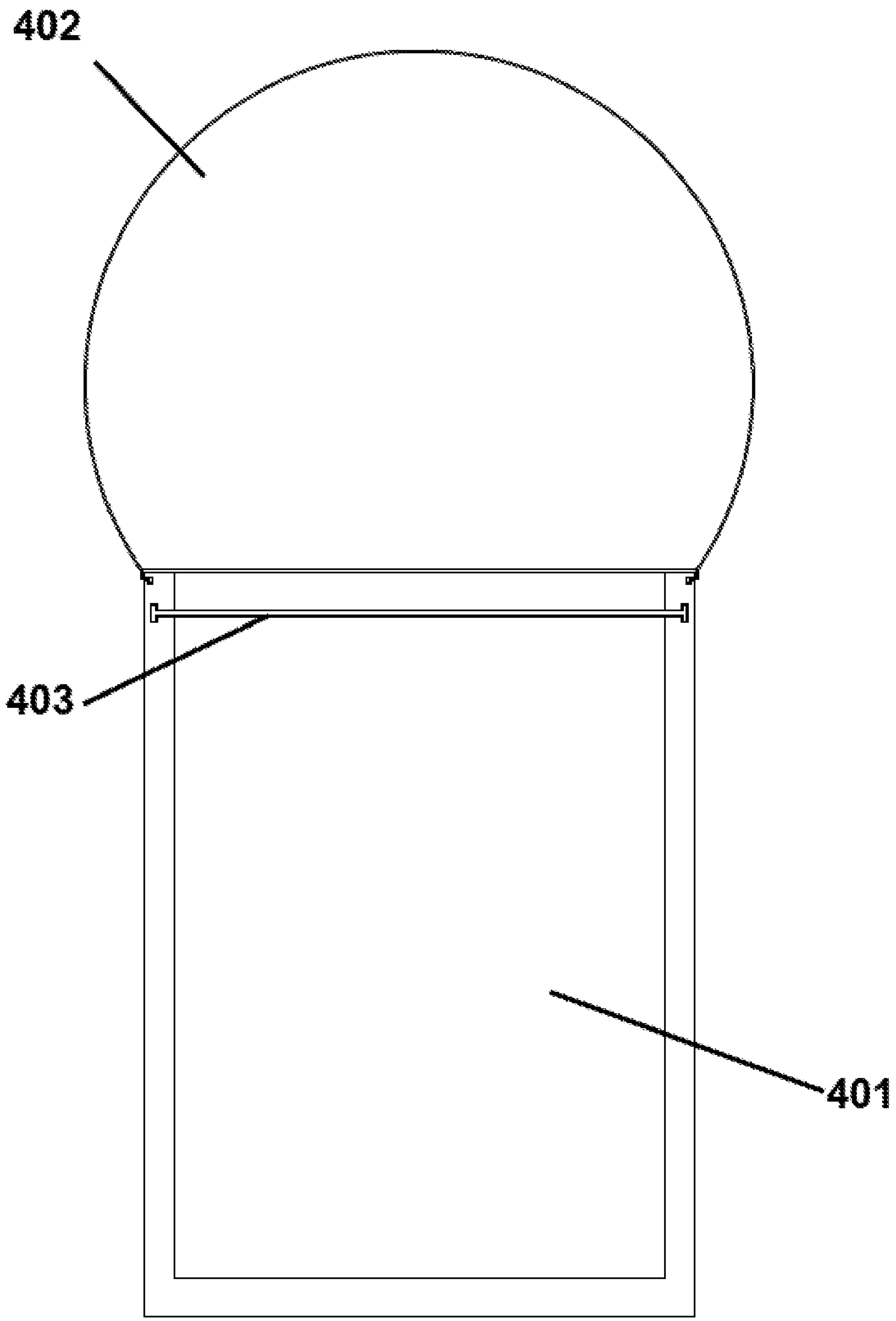
FIG. 5 is a front view of the container of FIG. 4, wherein the flexible element is inflated.
Figure 6:
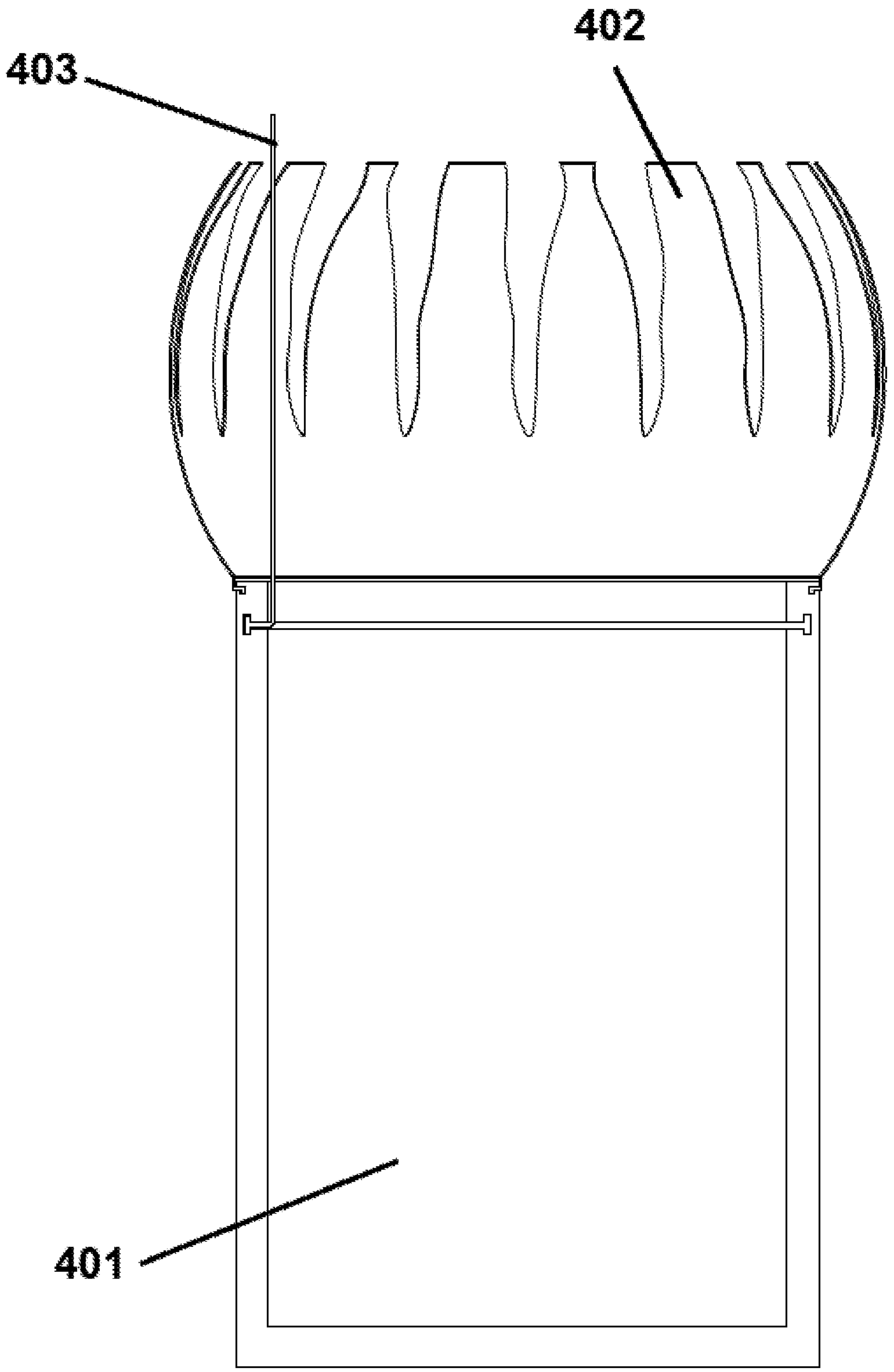
FIG. 6 is a front view of the container of FIG. 4, wherein the flexible element of FIG. 5 is torn, and the lid of the container is in an opened position.

FIG. 4 is a front view of a container 401, according to another embodiment of the present invention, in a closed position, wherein container 401 comprises an external flexible element 402 (not shown in FIG. 4 and shown in FIGS. 5 and 6). External element 402 surrounds lid 403 of container 401 from the outside, and according to this embodiment, the pressure values inside the inner volume of flexible element 402 and inside the container 401 are measured and controlled separately. As shown in FIG. 5, external flexible element 402 is inflated while container 401 is still closed (the inflating mechanism, which is easily understood by the skilled person, not being shown for the sake of simplicity). Before opening container 401, the pressure of the inner volume of element 402 can be equalled to the pressure of the environment, thus allowing to keep it in a static position while promoting the opening process by avoiding wasting time on the inflation of external flexible element 402 in close timing to the opening operation. If container 401 is surrounded by liquid, such as water, inflating flexible element 402 has to overcome a relatively significant added head of the mass of said liquid. By utilizing flexible element 402 to overcome the added mass head, this necessity is avoided for lid 403 of container 401, which can be easily opened inside the volume of inflated flexible element 402.

Of course, according to this embodiment, another pressure sensor is provided inside the inner volume of external flexible element 402. The measurements and control over the pressure values inside container 401 and element 402 are performed separately, and although the components of the pressure-regulating system are similar to those described with reference to FIGS. 1-3, according to the present embodiment there are additional tubing elements that connect the device that is suitable to raise pressure in both container 401 and element 402. According to another embodiment of the present invention, the system comprises an additional device suitable to raise pressure, wherein one device is connected to the container, and the other to the inner volume of external flexible element 402. According to yet another embodiment of the present invention, the system comprises a single compressed-air tank (or alternatively, a water pump) and a faucet suitable to allow flow to each volume in turns.

According to another embodiment of the invention, the system further comprises a connecting tube (not shown in the figures), which connects the inner volume of external flexible element 402 and the inner volume of container 401. Said connecting tube can further comprise a valve suitable to restrict the flow of fluids from container 401 into element 402 and also allow the pressure inside container 401 to be higher than the pressure of element 402.

FIG. 6 is a front view of container 401 of FIG. 4, wherein external flexible element 402 of FIG. 5 is torn, and the lid 403 of container 401 is in an open position. As described with reference to FIGS. 1-3, the opening of lid 403 can be performed by any means, and the pressure inside container 401 is higher than the pressure of the environment, thus allowing the passage of the content that was located inside container 401 toward the environment.

Figure 8A:
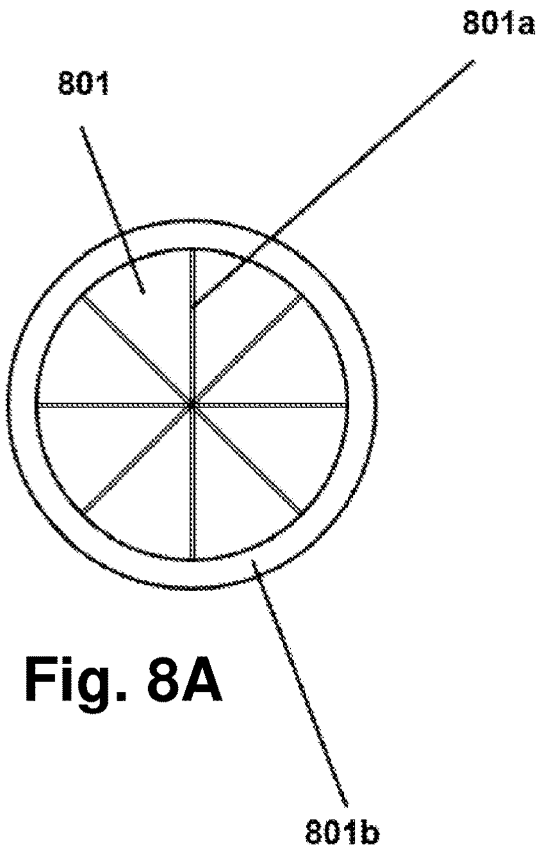
FIG. 8A is a top view of a flexible element, comprising spoke-shaped weak points.
Figure 8B:
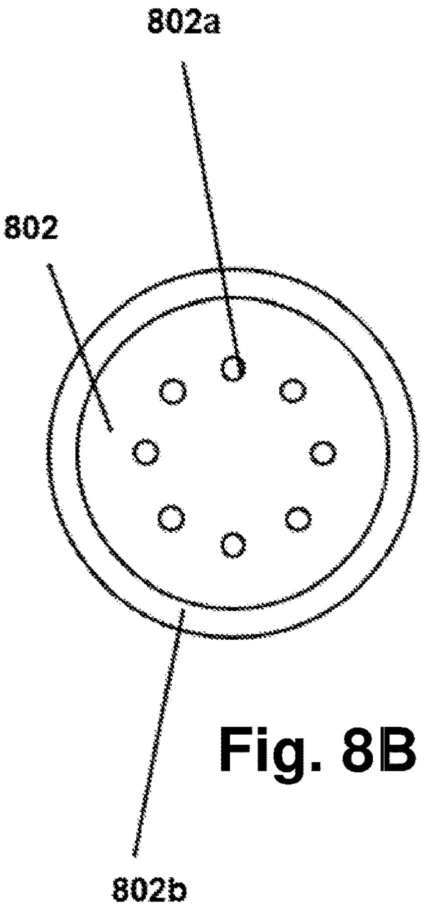
FIG. 8B is a top view of another flexible element, comprising dot-shaped weak points.
Figure 8C:
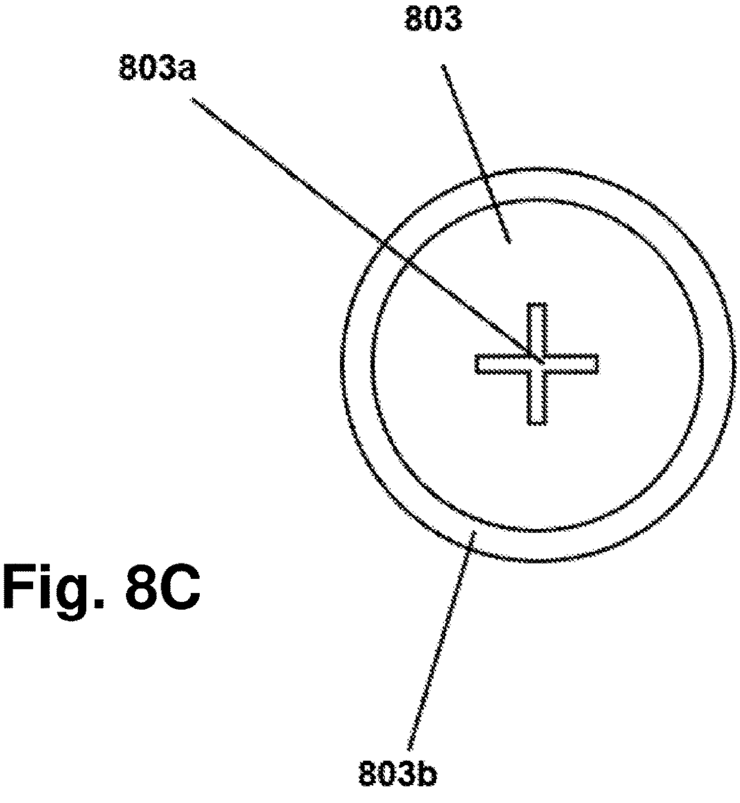
FIG. 8C is a top view of yet another flexible element, comprising cross-shaped weak points.

FIGS. 8(A through C) show top views of flexible elements 801-803, wherein each element illustrates a different shape of "weak points". Such weak points allow a controllable tearing of flexible elements 801-803 in order, for example, to enable components pre-installed within the container to exit said container with minimal contact with the flexible element. Element 801 of FIG. 8A comprises weak points 801*a*, which, according to one embodiment of the invention, are shaped as wheel-spokes at the middle of the element, but of course, the weak points that create a weak area are not restricted to any specific shape. Element 802 of FIG. 8B comprises weak points 802*a*, according to another embodiment of the invention, shaped as dots that are located at a constant radius from the center of element 802. According to yet another embodiment of the invention shown in FIG. 8C, element 803 comprises weak points 803*a* that form the shape of a plus sign. Every shape of weak points causes a different tearing pattern, which can be designed according to the needs of the system. Each element 801-803 also comprises a frame, marked respectively by numerals 801*b*-803*b*.

EXAMPLE

An experiment was performed in a set-up essentially as described with reference to FIG. 1, according to the following details:

Parameters

- An aluminum container with a volume of 1 cubic meter, and a round section with a diameter of 0.8 meter;
- A lid made of a toughened rubber;
- A rubber flexible element, comprising several small perforations for pressure regulation;
- Thickness of flexible element 2.5 mm.

Course of the Experiment

- The container was inserted into water, and the pressure-regulating system kept a pressure difference of 1 Bar between the inner volume of the container and its environment (where the pressure of the inner volume was higher than the pressure of the environment).
- An initial detachment between the lid and the container was performed by pyrotechnic means, which resulted in the inflation of the flexible element, since the element was positioned, after the initial detachment, between the inner volume of the container and the environment which had different pressure values. As the inflating flexible element kept inflating, it also kept pushing the lid of the container.
- The perforations of the flexible element provides pressure equalization that prevents the flexible element from sticking to the lid of the container. According to the present experiment, the flexible element was torn when it reached a 600% strain and a pressure difference of 0.1

Bar between its inner volume and the environment. At this point the diameter of the flexible element was around 1 meter.

The full operation, starting with the first step of the initial detachment up until the tearing of the flexible element, occurred within less than 250 milliseconds.

It should be noted that the different parameters—such as the material of the container, the lid, and the flexible element, the thickness of the flexible element, and the number of perforations in the flexible element—are not restricted to the parameters presented with reference to the initial experiment, or to any other materials, size, thickness, or number of perforations (if any). It should also be noted that the invention is not restricted to a specific range of pressure values, and the different parameters can be adjusted in order to allow the use of the invention in any depth or pressure conditions.

In addition, the example refers to pyrotechnic means used for an initial detachment of the container and its lid, but of course, said detachment can be performed by any other means, for example, by pneumatic, hydraulic, mechanical or any other means suitable to allow the opening of the lid.

As demonstrated, one significant advantage of the invention is the fact that the opening of containers that are under pressure, even in cases where the containers are located under water and need to overcome its added mass, is performed extremely fast, within milliseconds. The system and method, according to the present invention, also enable overcoming the drag force applied on the container, even when the lid of the container is flat and relatively large. Another great advantage of the present invention is the fact that it provides pressure release while avoiding bubbling, which is inevitable in other systems and causes loss of pressure.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims. Accordingly, the invention is not to be limited to the specific embodiments described and/or illustrated in the figures.

The invention claimed is:

1. A container assembly for use in a pressure environment comprising:

a container having an inner volume and an opening;

a lid adapted to seal the opening in a closed position of the lid;

a flexible and inflatable element extending along said opening between the inner volume of the container and the lid when the lid is in the closed position; and a pressure-regulating subsystem configured to raise pressure inside said container to a value higher than the pressure of the environment, said value causing the inflation of said flexible and inflatable element to thereby generate force that pushes the lid from the closed position toward an open position, wherein the inflatable flexible element is configured to tear after pushing the lid toward the open position.

2. A container assembly according to claim 1, wherein said lid is attached to said container with a hinge.

3. A container assembly according to claim 2, wherein the container is selected from the following: an underwater vessel, an underwater tubing system, aquaculture equipment, and a storage vessel.

4. A container assembly according to claim 1, wherein said flexible and inflatable element is made of a hyperelastic material.

5. A container assembly according to claim 1, wherein said flexible and inflatable element further comprises end portions that are structurally weakened and configured to be torn in a pre-defined pattern.

6. A container assembly according to claim 1, wherein said pressure-regulating subsystem comprises:

at least one pressure sensor located inside the container;

at least one pressure sensor located outside the container;

an inflation device configured to raise pressure inside the container;

at least one tube connecting an outlet of the inflation device to an inner volume of the container; and a controller configured to receive pressure information from said pressure sensor and to control the inflation device based on pressure information.

7. A container assembly according to claim 6, wherein the controller is further configured to control opening of the lid.

8. A container assembly according to claim 7, wherein the controller is provided with a program for opening the lid based on pressure measurements from the pressure sensors.

9. A container assembly according to claim 7, wherein the controller is provided with a program for opening the lid based on a pre-determined timing.

10. A container assembly according to claim 9, further comprising a timing component configured to communicate with the controller.

11. A container assembly according to claim 7, wherein the controller is remotely controlled.

12. A container assembly according to claim 1, wherein the flexible and inflatable element is made of a rubber material.

13. A container assembly according to claim 1, wherein the pressure-regulating subsystem further comprises a non-return valve located along the tube connecting the outlet of the inflation device and the inner volume of said container.

14. A container assembly according to claim 13, wherein the pressure-regulating subsystem further comprises an additional valve located between the non-return valve and the container.

15. A container assembly according to claim 1, wherein the flexible and inflatable element is provided with structurally weakened portions.

16. A container assembly according to claim 1, further comprising tearing elements configured to induce tearing of the flexible and inflatable element.

17. A container assembly according to claim 16, wherein the tearing elements comprise pyrotechnic means.

18. An opening system for containers that are under pressure A container assembly according to claim 1, wherein the flexible and inflatable element is external to the container.

19. A container assembly according to claim 1, wherein the pressure-regulating subsystem comprises a pump configured to raise pressure inside the container.

20. A container assembly according to claim 1, wherein the pressure-regulating subsystem comprises a compressed gas tank configured to raise pressure inside the container.

21. A container assembly according to claim 1, wherein the flexible and inflatable element is provided with perforations configured to provide pressure equalization between both sides of the flexible and inflatable element.

22. A method for opening a container assembly for use in a pressure environment, the container assembly comprising a container having an inner volume and an opening, a lid adapted to seal the opening in a closed position, and a flexible and inflatable element positioned between the inner volume of the container and the lid, the method comprising:

a) measuring the pressure inside and outside the container using at least one pressure sensor located inside the container assembly and at least one pressure sensor located outside the container assembly;

b) performing pressure values analysis by a controller based on the pressure measured in step a);

c) activating inflation of the flexible and inflatable element by a signal sent from the controller to raise the pressure inside the container to a value higher than the pressure of the environment, the raised pressure causing inflation of the flexible and inflatable element to generate force pushing the lid from the closed position toward an open position; and wherein the flexible and inflatable element tears after pushing the lid toward the open position.

* * * * *